Aug. 18, 1925. 1,550,514
D. B. DIMICK
PLANT FOR MOLDING SPIRAL CORRUGATED CAST IRON PIPE
Filed March 25, 1925 6 Sheets-Sheet 1

Inventor
D. B. Dimick
by Wilkinson & Fiusta
Attorneys.

Aug. 18, 1925.  
D. B. DIMICK  
1,550,514  
PLANT FOR MOLDING SPIRAL CORRUGATED CAST IRON PIPE  
Filed March 25, 1925  6 Sheets-Sheet 5

Inventor  
D. B. Dimick  
by Wilkinson & Giusta  
Attorneys.

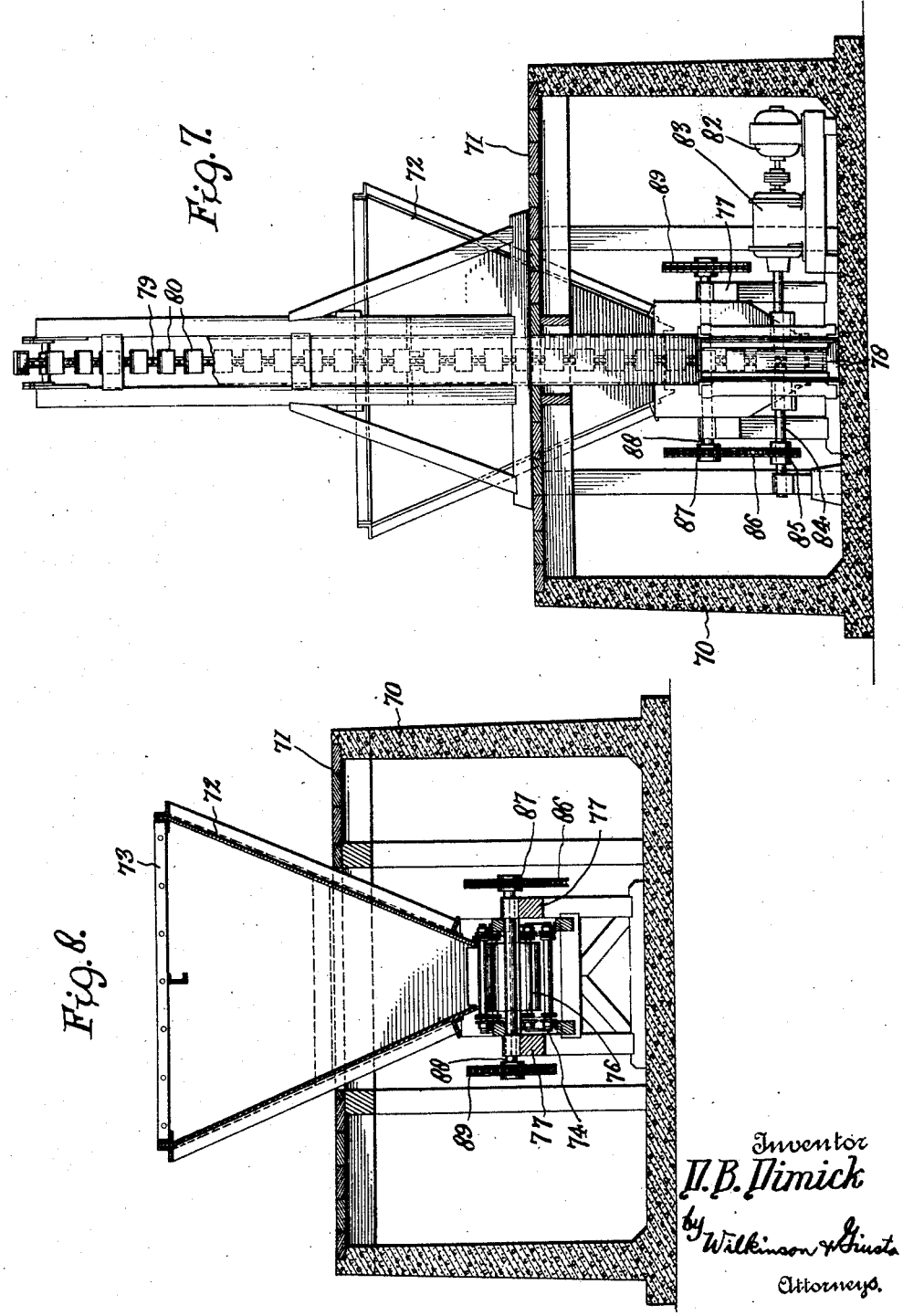

Patented Aug. 18, 1925.

1,550,514

UNITED STATES PATENT OFFICE.

DANIEL BAKER DIMICK, OF BIRMINGHAM, ALABAMA.

PLANT FOR MOLDING SPIRAL-CORRUGATED CAST-IRON PIPE.

Application filed March 25, 1925. Serial No. 18,269.

*To all whom it may concern:*

Be it known that I, DANIEL BAKER DIMICK, a citizen of the United States, residing at Birmingham, in the county of Jefferson and State of Alabama, have invented certain new and useful Improvements in Plants for Molding Spiral-Corrugated Cast-Iron Pipe; and I do hereby declare the following to be a full, clear, and exact description of the invention, such as will enable others skilled in the art to which it appertains to make and use the same.

The present invention relates to improvements in plants for molding spiral corrugated cast iron pipe and is a division in part of my co-pending application, filed November 10, 1924, Serial No. 749,068 entitled Improvements in molding of spiral corrugated cast iron pipe.

The article manufactured in the plant forming the subject matter of this application is set out more particularly in my co-pending application entitled Cast pipe and joint therefor, filed September 16, 1922, Serial No. 588,650.

The object of the present invention is to provide for the efficient foundry handling of the patterns and molds and in so grouping units of the mechanism as to economize on floor space in the foundry and upon the number of operators required to attend a given number of the machines.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation, with parts in section of the improved machine.

Figure 7 is a cross section taken on the line 7—7 in Figure 6, and

Figure 8 is also a cross section taken on the line 8—8 in Figure 6.

Figure 1:
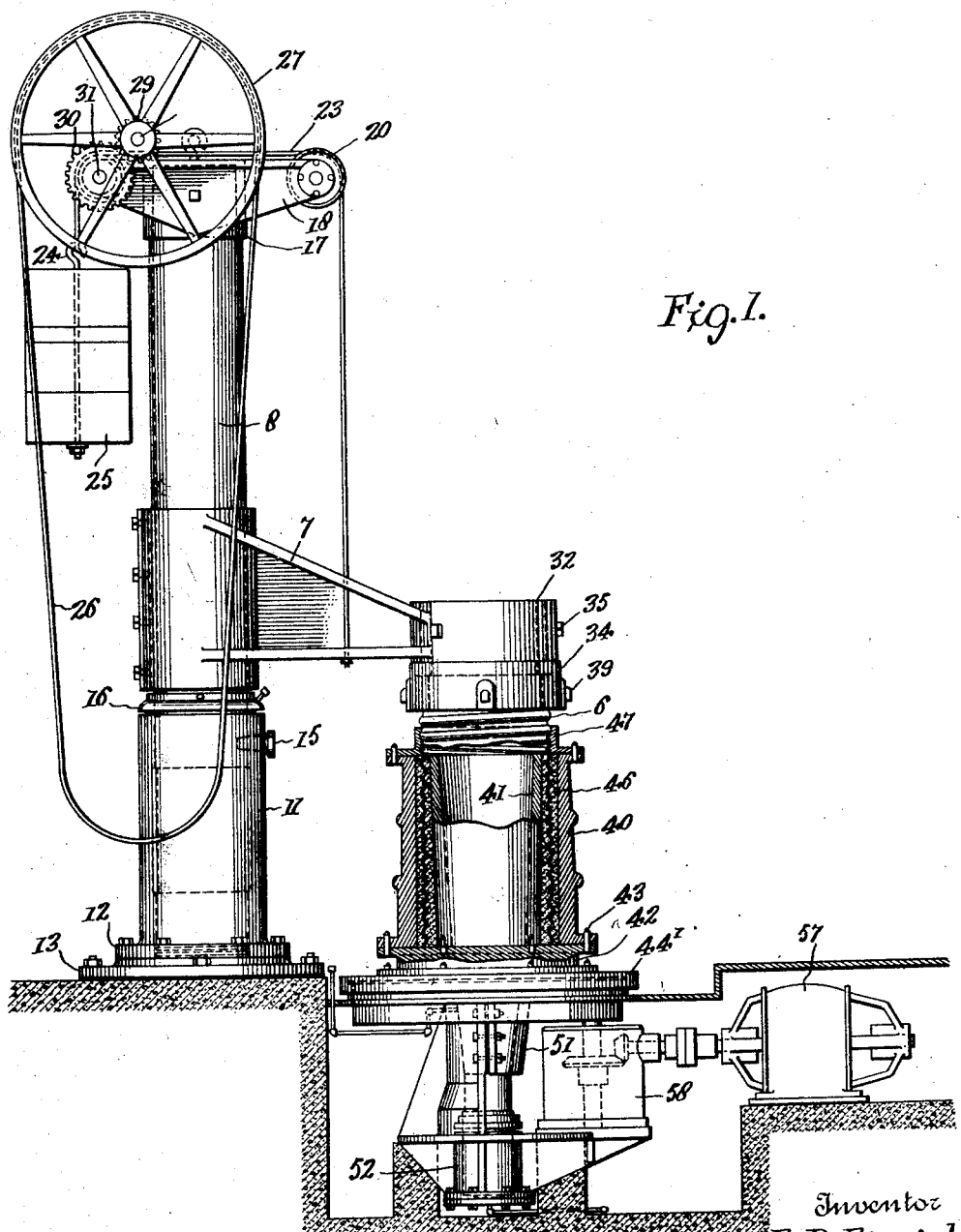

Referring for the present to Figures 1 to 4 inclusive 6 designates the cylindrical, hollow, spirally corrugated pattern suspended from the outer end of the arm 7 which is permitted to slide vertically upon the post 8 but prevented from rotating relatively to the post by reason of the engagement of the key 9 in the vertical groove 10 of the post.

Figure 3:
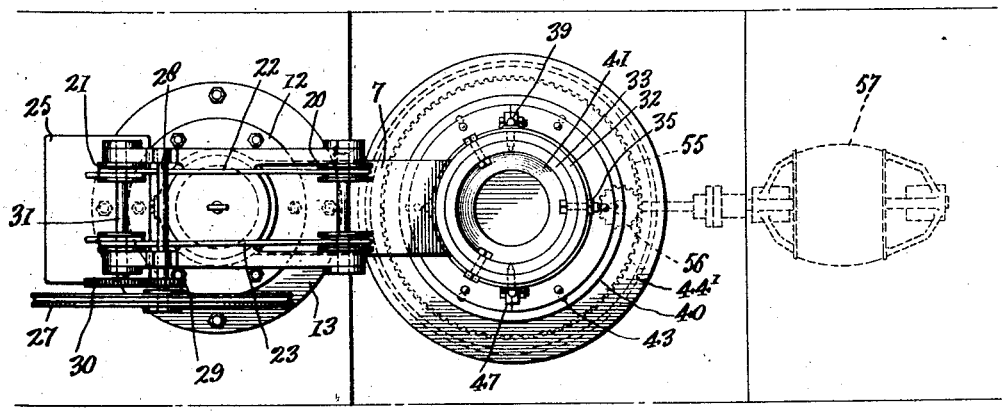
Figure 3 is a top plan view of the machine.
Figure 4:
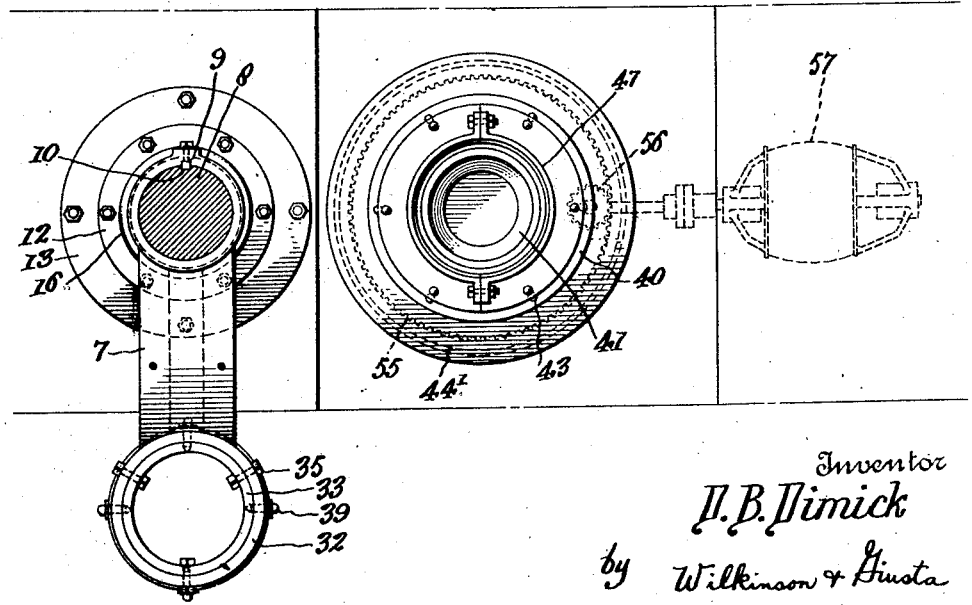
Figure 4 is a section taken on the line 4—4 in Figure 2 with the arm swung toward the side.

The post, however, is itself free to rotate about a substantially vertical axis and for this purpose it is mounted in the cylindrical pedestal 11 having the perforated flanges 12 at its base by which it is secured to the base plate or bed 13, the base plate being in turn bolted or otherwise affixed to the floor or foundation. Anti-friction bearings 14 are interposed beneath the lower end of the post 8 to afford easy rotation as by the hand of the operator. The arm 7 forms a lever by which the post and pattern may be swung. Figures 3 and 4 are comparative views showing the two positions of the arm. When the pattern is in the position over the mold a plug or pin 15 may be inserted through the pedestal and into a socket in the post 8 for holding the parts against accidental rotation. A dust collar 16 is secured to the post just above the upper end of the pedestal to exclude foreign matter from the bearings.

The arm 7 is preferably counter balanced to aid in the vertical movement, as when the pattern is raised and lowered. For this purpose a cap 17 is placed over the upper end of the post. From the cap extends a pair of forward arms 18 and a pair of rear arms 19, the arms each carrying pulleys or rollers 20 and 21. Four such pulleys are shown in Figure 3, the front pulleys being in line with the rear pulleys so as to receive the two cables 22 and 23 coupled to the arm 7 and to eye bolts 24 sustaining the counter weight 25.

The cables may be wrapped one or more times about the pulleys. In practice it is found best to simply have the cables play up and over the front pulleys and to be wrapped once about the rear pulleys. The counter balance weights 25 may be added to or reduced.

As shown in Figure 1 an endless hand cable or strap 26 extends down from a wheel 27 mounted upon the shaft 28 upon the cap plate. This shaft carries a pinion 29 meshing with a gear wheel 30 on the rear pulley shaft 31. By drawing upon either run of the cable 26 the operator may aid the vertical movement of the pattern.

The outer end of the arm carries an integral or attached ring 32 adapted to receive the ring 33 of the coupling head 34, bolts or other fastenings 35 being employed to detachably hold the rings together. The drawing head is provided with external and internal spaced flanges 36 and 37 to receive the upper ring 38 of the pattern 6. Pins 39 passing through the flanges 36 and 37 and the ring 38 are used to suspend the pattern from the head. This arrangement provides for flexibility in the pattern 6 to enable the pattern to accommodate itself to the mold and to the cavity in screwing out of the mold.

As shown in Figure 1 the pattern 6 is adapted initially to fit down within the mold composed of the cheek 40 and the core arbor 41. Both the cheek and arbor are pinned or otherwise affixed to the casting stool 42 as indicated respectively at 43 and 44. The mold parts are thus preserved in proper spaced relation and at the same time caused to turn with the casting stool 42. The casting stool 42 rests upon the turn table 44′ to which it is secured as by the pins 45.

The pattern 6, when in the mold, as appears in Figure 1 fits substantially midway between the cheek and the core and a sand-slinger is employed to throw sand upon both sides of the cylindrical pattern 6 making, in one molding operation a spiral, continuously cylindrical cavity 46 in the sand having external and internal walls upon which the spiral corrugation is simultaneously formed, the corrugations upon the inner wall being in lead with those upon the outer wall.

Figure 2:
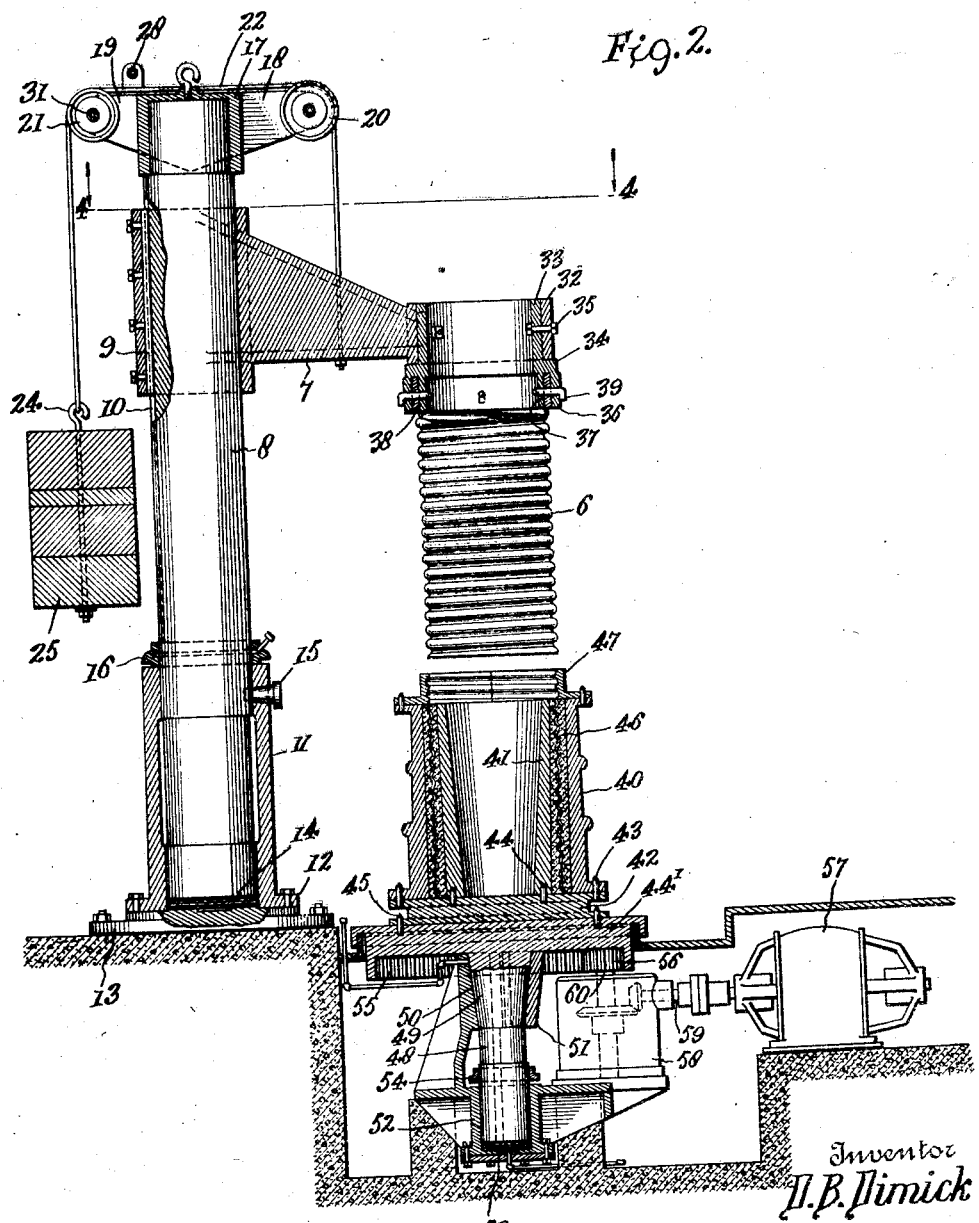
Figure 2 is a vertical section taken through the machine showing the pattern and other parts in a subsequent position.

The stripping plate is designated at 47 and is made up in two half sections so that it may be put in place upon the upper end of the cheek 40 after the sand has been introduced. The interior wall of the stripping plate is corrugated to conform to the external corrugations of the pattern 6 and to fit the outer wall of the pattern snugly. This stripping plate is pinned or clamped to the upper end of the cheek. Figure 2 shows the pattern withdrawn leaving the spiral cavity in the mold and the stripping plate in place upon the top of the cheek.

The turn table 44′ is mounted upon the shaft 48 having the upper tapered portion 49 fitting in the upper tapered bearing 50 provided with the removable cap plate or box 51. The lower portion of the shaft 48 fits within a cylindrical bearing 52 and upon anti-friction bearings 53 in the base thereof while a dust collar 54 is secured upon the shaft just above the lower cylindrical bearing 52. It is obvious that the turn table might be supported in any other manner appropriate to sustain the weight of the mold and other parts while permitting of free rotation thereof.

An internal gear 55 is made upon the lower portion of the turn table 44′. A pinion 56 meshes with the internal gear, the pinion being driven by the electric motor 57 through an appropriate reduction gear 58 having the high speed shaft 59 and the lower speed shaft 60. Any other motor might be used and appropriate control means is connected to the motor.

Figure 5:
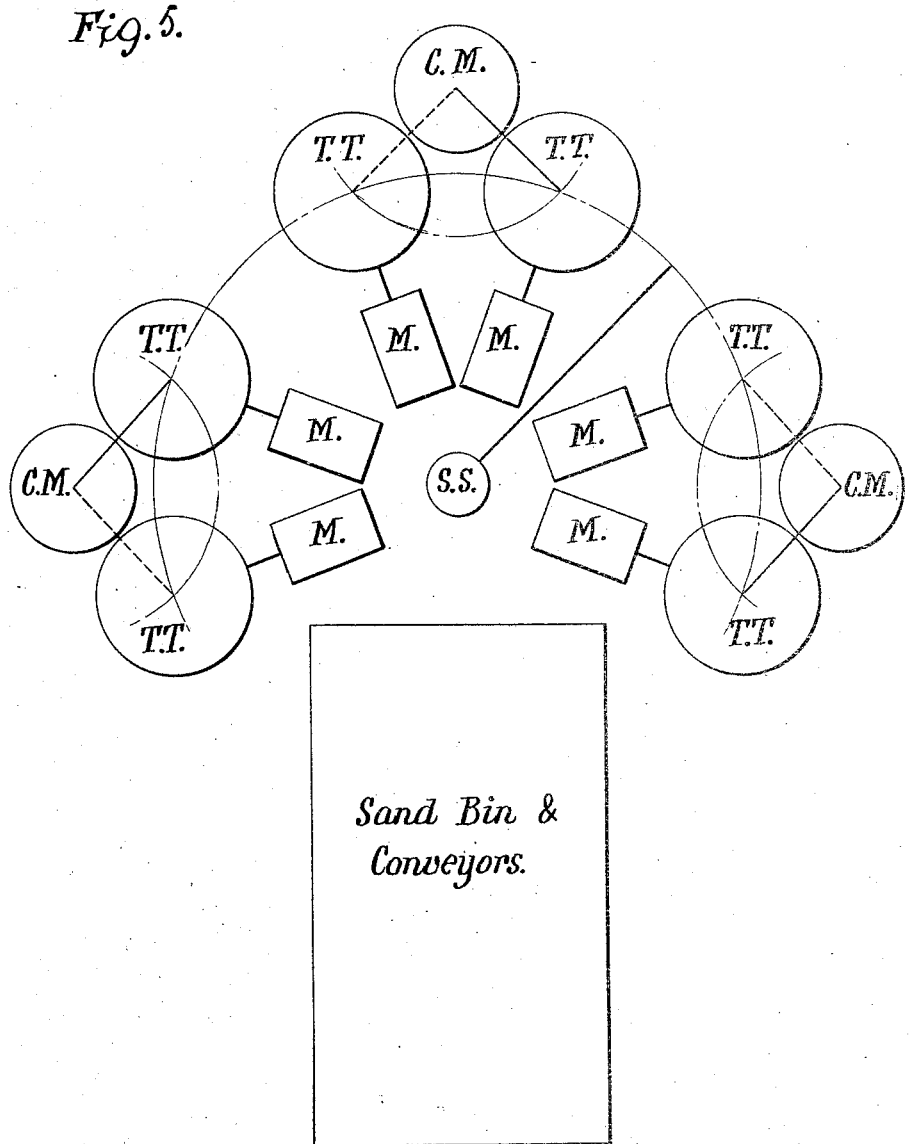
Figure 5 is a diagrammatic view showing the grouping of machines on the foundry floor.

The apparatus might, for purposes of understanding the diagrammatic illustration in Figure 5, be divided up into two parts, one called the centering machine consisting of the rotatable post 8 and its supporting arm 7 by which the pattern 6 is brought to a correct position with respect to the empty flask, and the second machine is the turning machine or turn table consisting of the assembly for supporting and imparting to the flask a rotary movement to effect removal of the pattern 6 from the sand cavity.

In Figure 5 the centering machines are designated "C. M." and it will be seen that three of these centering machines are employed located in triangular arrangement. Each centering machine serves two turn tables driven by the independent motors designated at "M."

These turn tables are all located on the arc of a circle struck from a center where the sand-slinger is located so that the sand-slinger has a radius of activity covering all of the tables. One sand-slinger is therefore easily enabled to take care of the six flasks upon the turn tables. The sand bin and conveyors are also indicated in this diagrammatic view at the open side of the circle for supplying sand continuously to the sand-slinger.

While the sand-slinger is packing sand in a flask upon one turn table of each pair, the centering machine is engaged in placing a pattern in the empty flask of the companion turn table so that the operation is substantially a continuous one and three centering machines and a single sand-slinger are enabled to take care of six turn tables.

After the flasks have been rammed and the patterns 6 removed, the flasks are withdrawn to the casting floor where the molten metal is poured in the spiral cavity.

In the use of the device a pattern 6 is coupled to the arm 7 and the column 8 is rotated until the pattern is centered above the empty flask upon one of the turn tables. The plug 15 is then inserted in order to prevent possible angular movement of the column 8 and the arm 7 is lowered until the pattern rests upon the casting stool.

The sand-slinger is then put into operation and sand is rammed onto both sides of the pattern 6. Subsequently the turn table 44' is caused to rotate by closing the circuit of the electric motor 57 and inasmuch as the pattern 6 is held fast against rotation the stripping plate will act as a revolving nut tending to lift the pattern out of the sand.

This movement is made easy by the use of the counter weight and also if necessary by the aid of the operator who may pull down upon the counter weight or press up on the arm 7. This pressure should be light in order that the spiral wall in the sand be not distorted.

The pattern is then swung to the other turn table and inserted in the flask and sand is rammed in this flask while the finished flask is removed to the casting floor and an empty flask substituted in its place. The device and the assembly of these devices in the foundry are effected with a view to simplicity in construction and a minimum number of the machines without sacrificing the capacity of the plant. The arrangement shown in Figure 5 makes it possible to operate the plant with considerably less labor.

Figure 6:
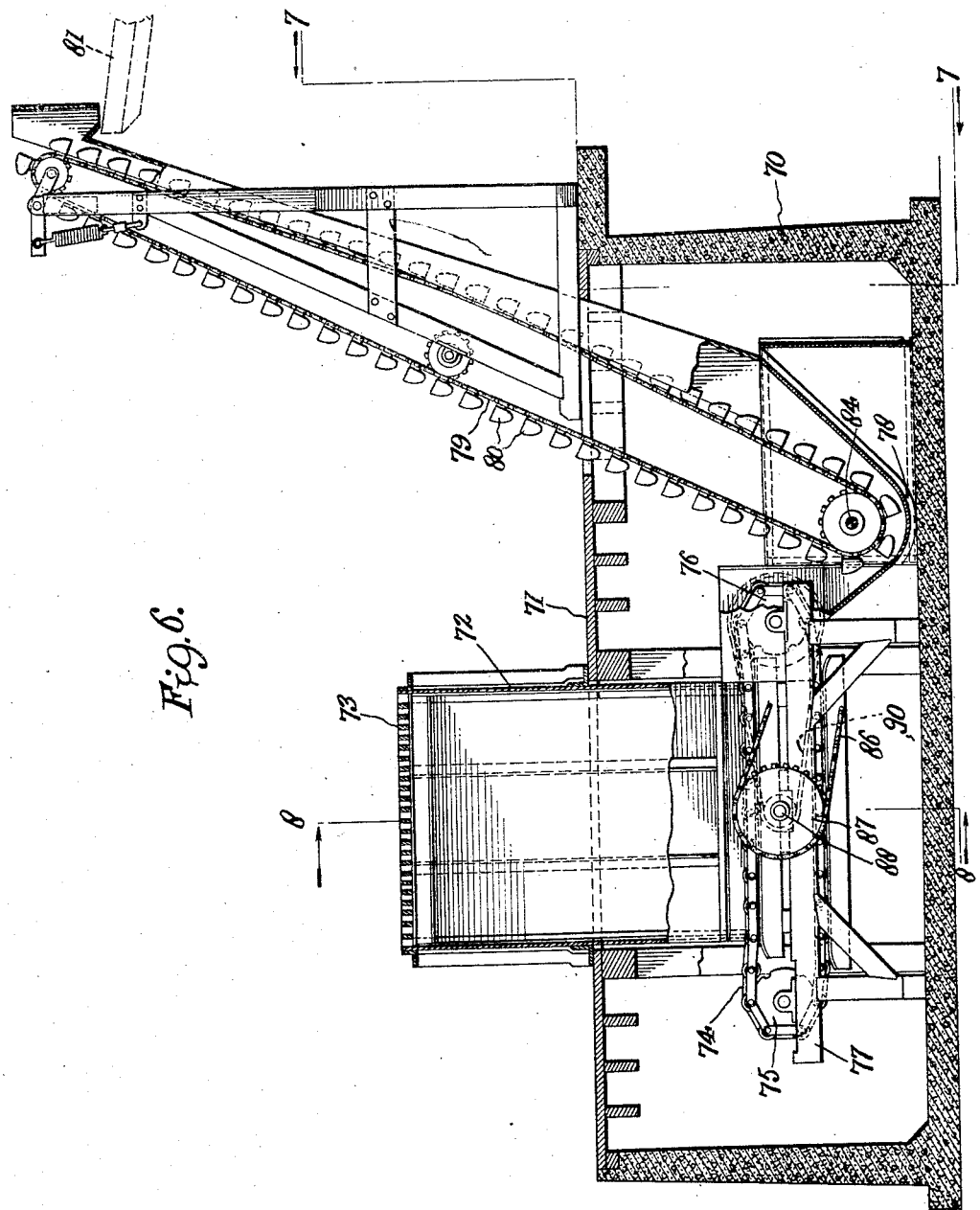
Figure 6 is a longitudinal vertical section taken through a device for supplying sand to the sand-slinger.

The space marked off in Figure 5 with the legend "Sand bin and conveyors" is occupied by the apparatus shown in Figures 6, 7 and 8. This apparatus is preferably contained in a concrete or other pit 70 sunk below the floor level 71, a portion of the floor being adapted to close the top portion of the pit. A hopper 72 is disposed in the pit with its upper part projecting above the floor 71. The upper open end of the hopper into which the sand is thrown through the grating 73 will be arranged at only a small elevation from the floor 71 to permit of ease in throwing the sand into this hopper. The hopper directs the sand down to the horizontal apron conveyor 74 arranged to run over the end rollers 75 and 76 journaled in the frame 77 supported within the pit. At the delivery end of the conveyor and beneath the same is the boot 78 into which the sand is thrown from the conveyor 74. A second elevating conveyor 79 is disposed with one end in the boot and provided with buckets 80 for scooping up the sand and carrying the same upwardly to the chute 81 which carries the sand to the hopper of the sand slinger.

As shown in Figure 7 the conveyors are both driven from the electric motor 82 through the reduction gear 83 and shaft 84 which may be the lower shaft of the elevating conveyor 79. The shaft 84 is provided with a sprocket 85 engaged by a chain 86. This chain 86 also engages the sprocket 87 on the counter shaft 88. This counter shaft is journaled in the frame 77 of the horizontal conveyor extending between the upper and lower runs of said conveyor. At the opposite end of this shaft 88 is the sprocket 89 connected by a chain 90 with a sprocket coupled to the wheel 76 of the horizontal conveyor.

The entire mechanism connected with these conveyors and sand handling equipment and the entire mechanism of the sand slinger may be arranged for concerted operation by circuits extending in common to the several motors thereof, and with for instance two push buttons located in the head of the sand slinger. One push button will start all the motors and the other push button will stop the motors in accordance with a well known switch arrangement. Consequently the feeding of the sand and the throwing of the sand into the mold is carried on automatically and concertedly without the use of manual labor with the exception of an operator to open and close the switch.

The entire mold is made in one operation and furthermore this plant arrangement permits of the rapid construction of the green sand mold, which, when completed, is ready to receive the molten iron without the use of any additional or auxiliary dry sand cores or dry sand auxiliaries or chills. Throughout the improved arrangement, the plant produces a finished green sand mold without the use of man-power.

It is obvious that various changes and modifications may be made in the details of construction and design of the above specifically described embodiment of this invention without departing from the spirit thereof, such changes and modifications being restricted only by the scope of the following claims.

What is claimed is:—

1. An apparatus for casting pipe comprising a centering machine having a swinging and longitudinally moving arm, and a spirally corrugated pattern carried fixedly in said arm, two turn tables located on the same arc of movement with said arm of the centering machine, and a sand-slinger located on the same arc of movement with the two turn tables.

2. An apparatus for casting pipe comprising a series of pairs of turn tables all located on the same circumference, a sand-slinger centrally of said turn tables for serving all such turn tables, and centering machines for each pair of turn tables having a pattern supporting arm swinging alternately from one turn table to the other.

3. An apparatus for casting pipe comprising a sand-slinger located centrally, a source of supply located adjacent said sand-slinger, a number of pairs of turn tables together with operating motors, said turn tables being all located in a circle about said sand-slinger as a center whereby the sand-slinger may serve all of the flasks upon the turn tables, and a centering machine for each pair of turn tables located outside said circle and having a pattern supporting arm swinging alternately between the two turn tables.

4. An apparatus for molding pipe comprising a centering machine having a swinging arm, a pattern carried detachably by said arm, a plurality of turn tables for holding the mold, said turn tables being located as respects their centers upon the arc of swinging movement of said arm of the centering machine, and sand-ramming means disposed centrally with respect to the turn tables and movable in an arc intersecting the centers of both said turn tables.

5. An apparatus for molding pipe comprising a central station, a sand-slinger located at the central portion of said station, means also at the central station for supplying sand to said sand-slinger, turn tables mounted in pairs about said central station and being all disposed on the same arc of movement of said sand-slinger, and a centering machine for each pair of turn tables having an arm for supporting the pattern adapted to swing over either of the pair of turn tables.

6. A plant arrangement for the molding of spiral corrugated cast iron pipe comprising pairs of turn tables all arranged on the circumference of a common circle and having independent means to rotate same, a centering machine for each pair of turn tables located between the turn tables and outside said circumference, each centering machine having a swinging arm for the pattern adapted to move back and forth above either of its respective pair of turn tables, a sand-slinging machine located at the center of said circumference and having a range of movement above all of said turn tables, and an apparatus adjacent the sand-slinger for continuously supplying sand thereto.

7. A plant arrangement for the molding of spiral corrugated cast iron pipe comprising pairs of turn tables all arranged on the circumference of a common circle and having independent means to rotate same, a centering machine for each pair of turn tables located between the turn tables and outside said circumference, each centering machine having a swinging arm for the pattern adapted to move back and forth above either of its respective pair of turn tables, a sand-slinging machine located at the center of said circumference and having a range of movement above all of said turn tables, a comparatively low receiving device for the sand, and means to elevate said sand to the sand slinger.

8. A plant arrangement for the molding of spiral corrugated cast iron pipe comprising pairs of turn tables all arranged on the circumference of a common circle and having independent means to rotate same, a centering machine for each pair of turn tables located between the turn tables and outside said circumference, each centering machine having a swinging arm for the pattern adapted to move back and forth above either of its respective pair of turn tables, a sand-slinging machine located at the center of said circumference and having a range of movement above all of said turn tables, a hopper adjoining the sand-slinger with its receiving end closed to the casting floor, a conveyor beneath said hopper, a boot for receiving the sand from said conveyor, and an elevator adapted to operate through said boot for raising the sand to said sand-slinger.

DANIEL BAKER DIMICK.